US011490369B2

(12) United States Patent
Abedini et al.

(10) Patent No.: US 11,490,369 B2
(45) Date of Patent: Nov. 1, 2022

(54) RESOURCE MANAGEMENT FOR MULTI-HOP NETWORKS

(71) Applicant: QUALCOMM Incorporated, San Diego, CA (US)

(72) Inventors: Navid Abedini, Somerset, NJ (US); Karl Georg Hampel, Hoboken, NJ (US); Luca Blessent, Whitehouse Station, NJ (US); Jianghong Luo, Skillman, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 16/817,422

(22) Filed: Mar. 12, 2020

(65) Prior Publication Data

US 2020/0305128 A1 Sep. 24, 2020

Related U.S. Application Data

(60) Provisional application No. 62/898,970, filed on Sep. 11, 2019, provisional application No. 62/821,350, filed on Mar. 20, 2019.

(51) Int. Cl.
*H04W 72/04* (2009.01)
*H04W 74/08* (2009.01)
*H04W 76/30* (2018.01)

(52) U.S. Cl.
CPC ......... *H04W 72/04* (2013.01); *H04W 72/042* (2013.01); *H04W 72/046* (2013.01); *H04W 74/0833* (2013.01); *H04W 76/30* (2018.02)

(58) Field of Classification Search
CPC ............... H04W 72/046; H04W 76/30; H04W 36/0072; H04W 72/0433
See application file for complete search history.

(56) References Cited

U.S. PATENT DOCUMENTS

2018/0332516 A1* 11/2018 Oak ...................... H04W 36/08
2018/0368205 A1* 12/2018 Park ........................ H04L 41/06
(Continued)

OTHER PUBLICATIONS

Samsung: "Discussions dngNB-CU/Du Configuration Update Procedures", 3GPP Draft; R3-173859_CUDUCONFIG_V1.0, 3rd Generation Partnership Project (3gpp), Mobile Competence Centre; 650, Route Des Lucioles; F-06921 Sophia-Antipolis Cedex; France, vol. Ran WG3, No. Prague, Czech; Oct. 9, 2017-Oct. 13, 2017 Oct. 9, 2017 (Oct. 9, 2017), XP051344283, 3 pages, Retrieved from the Internet: URL: http://www.3gpp.org/ftp/Meetings_3GPP_SYNC/RAN3/Docs/ [retrieved on Oct. 9, 2017].
(Continued)

Primary Examiner — Raj Jain
(74) Attorney, Agent, or Firm — Harrity & Harrity, LLP

(57) ABSTRACT

Various aspects of the present disclosure generally relate to wireless communication. In some aspects, a central unit (CU) may receive, from a distributed unit (DU), a first DU configuration. The CU may transmit to the DU, a second DU configuration to change a DU configuration from the first DU configuration to the second DU configuration, the first DU configuration being different from the second DU configuration. The DU may override the first DU configuration to communicate in accordance with the second DU configuration. Numerous other aspects are provided.

30 Claims, 8 Drawing Sheets

(56) References Cited

U.S. PATENT DOCUMENTS

| | | | |
|---|---|---|---|
| 2019/0075552 A1* | 3/2019 | Yu | H04W 72/04 |
| 2019/0253915 A1* | 8/2019 | Joseph | H04W 28/0215 |
| 2020/0252988 A1* | 8/2020 | Wang | H04W 76/19 |
| 2020/0305128 A1* | 9/2020 | Abedini | H04W 72/04 |

OTHER PUBLICATIONS

Huawei et al., "Corrections on gNB-CU/gNB-DU Configuration Update", 3GPP Draft; 38473_CR0231_(REL-15)_R3-190333, 3rd Generation Partnership Project (3gpp), Mobile Competence Centre; 650, Route Des Lucioles; F-06921 Sophia-Antipolis Cedex; France, vol. Ran WG3, No. Athens; Feb. 25, 2019-Mar. 1, 2019, Mar. 14, 2019 (Mar. 14, 2019), XP051690451, 5 pages, Retrieved from the Internet: URL: http://www.3gpp.org/ftp/tsg%5Fran/TSG%5FRAN/TSGR%5F83/Docs/RP%2D190554%2Ezip [retrieved on Mar. 14, 2019].

Huawei: "(TP for SA BL CR) Slice Availability over F1", 3GPP Draft; R3-181112, Capturing Slice Availability over F1 Agreements in TS38.473, 3rd Generation Partnership Project (3gpp), Mobile Competence Centre; 650, Route Des Lucioles; F-06921 Sophia-Antipolis Cedex; France, vol. Ran WG3, No. Athens, Greece; Feb. 26, 2018-Mar. 2, 2018, Feb. 16, 2018 (Feb. 16, 2018), XP051401436, 2 pages, Retrieved from the Internet: URL: http://www.3gpp.org/ftp/tsg%5Fran/WG3%5Flu/TSGR3%5F99/Docs/ [retrieved on Feb. 16, 2018].

International Search Report and Written Opinion—PCT/US2020/022676—ISA/EPO—dated Jun. 2, 2020.

NTT Docomo et al., "Extensions of SSBs for Inter-IAB-Node Discovery and Measurements", 3GPP Draft; R1-1900958_Extensions of SSBs for Inter-IAB-Node Discovery and Measurements_Final, 3rd Generation Partnership Project (3gpp), Mobile Competence Centre; 650, Route Des Lucioles; F-06921 Sophia-Antipolis Cedex; France, vol. RAN WG1, No. Taipei; Jan. 21, 2019-Jan. 25, 2019, Jan. 20, 2019 (Jan. 20, 2019, XP051593803, 5 pages, Retrieved from the Internet: URL: http://www.3gpp.org/ftp/Meetings%5F3GPP%5FSYNC/RAN1/Docs/R1%2D1900958%2Ezip [retrieved on Jan. 20, 2019].

Qualcomm Incorporated: "IAB Resource Partitioning for Architecture Group 1", 3GPP Draft, 3GPP TSG RAN WG2 Meeting #102, R2-1808006 IAB Resource Partitioning for Architecture Group 1, 3RD Generation Partnership Project (3GPP), Mobile Competence Centre, 650, Route Des Lucioles, F-06921 Sophia-Antipolis Cede, vol. RAN WG2, No. Busan, South Korea, May 21, 2018-May 25, 2018, May 20, 2018 (May 20, 2018), XP051444329, 3 Pages, Retrieved from the Internet: URL: http://www.3gpp.org/ftp/Meetings%5F3GPP%5FSYNC/RAN2/Docs/[retrieved on May 20, 2018], p. 2, figure 2, figures 1, 2, sections 1, 2.

Samsung: "Discussions on gNB-CU/DU Configuration Update Procedures", 3GPP Draft; R3-173859_CUDUCONFIG_V1.0, 3rd Generation Partnership Project (3gpp), Mobile Competence Centre; 650, Route Des Lucioles; F-06921 Sophia-Antipolis Cedex; France, vol. RAN WG3, No. Prague, Czech; Oct. 9, 2017-Oct. 13, 2017 Oct. 9, 2017 (Oct. 9, 2017), XP051344283, 3 pages, Retrieved from the Internet: URL: http://www.3gpp.org/ftp/Meetings_3GPP_SYNC/RAN3/Docs/[retrieved on Oct. 9, 2017].

* cited by examiner

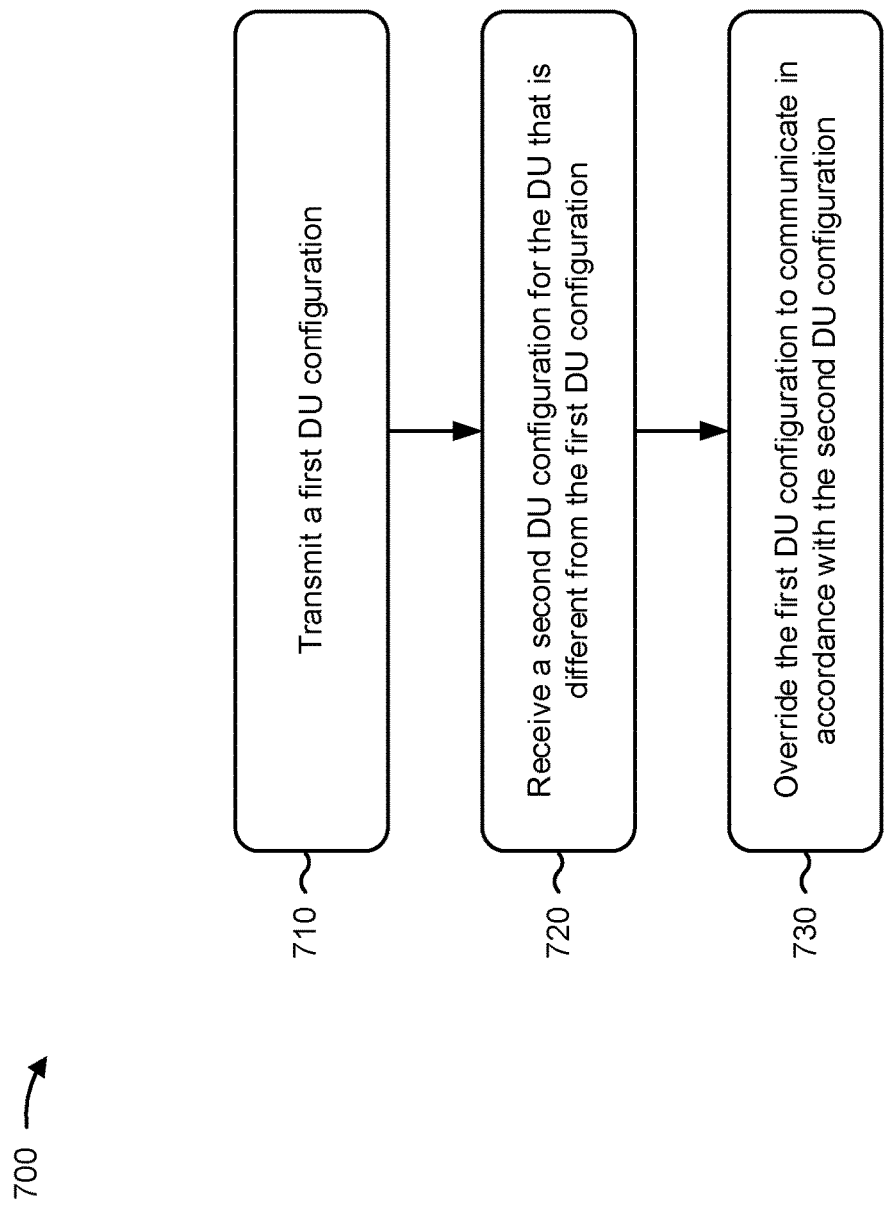

RESOURCE MANAGEMENT FOR MULTI-HOP NETWORKS

CROSS-REFERENCE TO RELATED APPLICATIONS

This patent application claims priority to U.S. Provisional Patent Application No. 62/821,350, filed on Mar. 20, 2019, entitled "RESOURCE MANAGEMENT FOR MULTI-HOP NETWORKS," and to U.S. Provisional Patent Application No. 62/898,970, filed on Sep. 11, 2019, entitled "RESOURCE MANAGEMENT FOR MULTI-HOP NETWORKS," which are each assigned to the assignee hereof. The disclosures of the prior applications are considered part of and are incorporated by reference in this patent application.

INTRODUCTION

Aspects of the present disclosure generally relate to wireless communication, and more particularly to techniques and apparatuses for resource management in a multi-hop network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a central unit (CU), may include receiving, from a distributed unit (DU), a first DU configuration. The method may include transmitting, to the DU, a second DU configuration to change a DU configuration from the first DU configuration to the second DU configuration, the first DU configuration being different from the second DU configuration.

In some aspects, a method of wireless communication, performed by a distributed unit (DU), may include transmitting, to a central unit (CU), a first DU configuration. The method may include receiving, from the CU, a second DU configuration for the DU that is different from the first DU configuration; and overriding the first DU configuration to communicate in accordance with the second DU configuration.

In some aspects, a method of wireless communication, performed by a central unit (CU), may include receiving, from a distributed unit (DU), a first DU configuration. The method may include transmitting, to the DU, a second DU configuration to change a DU configuration from the first DU configuration to the second DU configuration, the first DU configuration being different from the second DU configuration, and the second DU configuration identifies a change to a synchronization signal block (SSB) configuration.

In some aspects, a CU for wireless communication may include a memory and one or more processors coupled to the memory. The memory and the one or more processors may be configured to receive, from a distributed unit (DU), a first DU configuration and to transmit, to the DU, a second DU configuration to change a DU configuration from the first DU configuration to the second DU configuration, the first DU configuration being different from the second DU configuration.

In some aspects, a DU for wireless communication may include a memory and one or more processors coupled to the memory. The memory and the one or more processors may be configured to transmit, to a central unit (CU), a first DU configuration, to receive, from the CU, a second DU configuration for the DU that is different from the first DU configuration, and to override the first DU configuration to communicate in accordance with the second DU configuration.

In some aspects, a CU for wireless communication may include a memory and one or more processors coupled to the memory. The memory and the one or more processors may be configured to receive, from a distributed unit (DU), a first DU configuration, and to transmit, to the DU, a second DU configuration to change a DU configuration from the first DU configuration to the second DU configuration, the first DU configuration being different from the second DU configuration, and the second DU configuration identifies a change to a synchronization signal block (SSB) configuration.

In some aspects, a non-transitory computer-readable medium may store one or more instructions for wireless communication. The one or more instructions, when executed by one or more processors of a CU, may cause the one or more processors to receive, from a distributed unit (DU), a first DU configuration; and transmit, to the DU, a second DU configuration to change a DU configuration from the first DU configuration to the second DU configuration, the first DU configuration being different from the second DU configuration.

In some aspects, a non-transitory computer-readable medium may store one or more instructions for wireless communication. The one or more instructions, when executed by one or more processors of a DU, may cause the one or more processors to transmit, to a central unit (CU), a first DU configuration, receive, from the CU, a second DU configuration for the DU that is different from the first DU configuration, and override the first DU configuration to communicate in accordance with the second DU configuration.

In some aspects, a non-transitory computer-readable medium may store one or more instructions for wireless communication. The one or more instructions, when executed by one or more processors of a CU, may cause the one or more processors to receive, from a distributed unit (DU), a first DU configuration and transmit, to the DU, a second DU configuration to change a DU configuration from the first DU configuration to the second DU configuration, the first DU configuration being different from the second DU configuration, the second DU configuration identifies a change to a synchronization signal block (SSB) configuration.

In some aspects, an apparatus for wireless communication may include means for receiving, from a distributed unit (DU), a first DU configuration and means for transmitting, to the DU, a second DU configuration to change a DU configuration from the first DU configuration to the second DU configuration, the first DU configuration being different from the second DU configuration.

In some aspects, an apparatus for wireless communication may include means for transmitting, to a central unit (CU), a first DU configuration, means for receiving, from the CU, a second DU configuration for the DU that is different from the first DU configuration, and means for overriding the first DU configuration to communicate in accordance with the second DU configuration.

In some aspects, an apparatus for wireless communication may include means for receiving, from a distributed unit (DU), a first DU configuration and means for transmitting, to the DU, a second DU configuration to change a DU configuration from the first DU configuration to the second DU configuration, the first DU configuration being different from the second DU configuration, the second DU configuration identifies a change to a synchronization signal block (SSB) configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a DU, in accordance with various aspects of the present disclosure.

DETAILED DESCRIPTION

Figure 1:
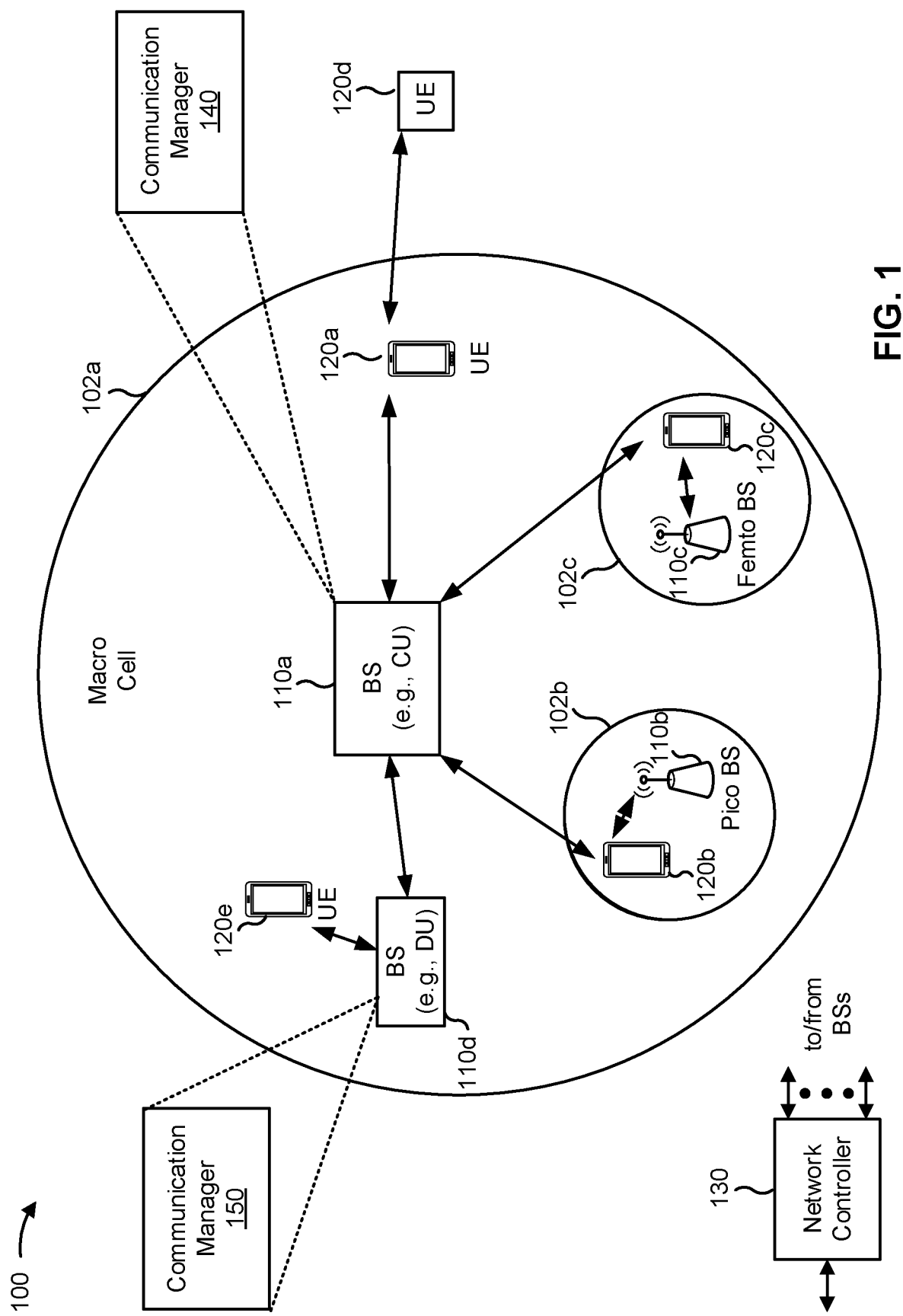
FIG. 1 is a block diagram conceptually illustrating an example of a wireless communication network, in accordance with various aspects of the present disclosure.

In some communications systems, such as 5G communications systems that use integrated access and backhauling (IAB), a central unit (CU)-distributed unit (DU) architecture may be used. For example, an IAB-donor may be hierarchically connected to a set of IAB-nodes, a set of UEs, and/or the like. In this case, the IAB-donor may include a CU, which performs access node controller (ANC) functions, core access and mobility management (AMF) functions, and/or the like, that semi-statically allocates resources to DUs of the set of IAB-nodes via an F1 application protocol (F1-AP) interface. A DU may dynamically schedule for child links (e.g., links to inferior wireless nodes, as described in more detail herein) within semi-static resources. For example, a first DU may schedule for a second DU or for a UE that is hierarchically inferior to the first DU using dynamic signaling. Further, the first DU may dynamically release resources allocated to the first DU for use by the second DU when the first DU determines that the first DU does not need to use the resources.

A DU may determine and indicate a content of an information block to a CU. For example, the DU may indicate a content of a system information block type 1 (SIB1), a master information block (MIB), and/or the like to the CU. The information block may be dependent on a DU configuration, such as a configuration of resources in which synchronization signal blocks (SSBs) may be transmitted, a configuration of resources in which a remaining minimum system information (RMSI) physical downlink control channel (PDCCH) transmissions may occur, a random access channel (RACH) resource configuration, a slot allocation configuration (e.g., whether a slot is configured as an uplink slot, a downlink slot, or a flexible slot), a combination thereof, and/or the like.

However, although the DU can signal the information block to the CU and periodically update the information block, the CU lacks defined signaling to override the information block for the DU. As a result, the DU may constrain the CU with regard to flexibility in scheduling resource allocations. For example, the CU may determine a semi-static resource allocation that complies with resource configurations determined by DUs associated with the CU and indicated using respective information blocks. As each DU may lack visibility regarding the other DUs, any DU may inadvertently constrain the CU to a network configuration and resource allocation that results in an inefficient or conflicting utilization of network resources.

Furthermore, in some cases a mobile cell may be deployed in a network that uses IAB. For example, a set of mobile DUs may be deployed to provide coverage in an area. However, when greater than a threshold quantity of mobile DUs are deployed in the same location, the mobile DUs may have coverage overlaps. Additionally, or alternatively, the mobile DUs may provide cells that are adjacent to each other. In some cases, the mobile DUs may cause a collision or conflict between configurations selected by neighboring cells provided by the mobile DUs.

Some aspects described herein enable resource management for multi-hop networks. For example, a CU may receive a first DU configuration from a DU. In this case, the CU may provide a second DU configuration to the DU to change a DU configuration for the DU. In this way, the CU, which may have visibility of each DU in a hierarchy of a CU-DU architecture of a network, may efficiently set a configuration of a network and efficiently allocate resources for the network, thereby improving network utilization and performance.

Additionally, or alternatively, some aspects described herein may provide for transmit power and interference management. For example, a CU and/or a DU may detect an interference issue, identify a source of the interference issue, and may perform an interference reduction procedure to obviate the interference issue. For example, a DU may select a preamble format, as part of the DU configuration, with a larger cyclic shift than other DU configurations. In some aspects, the CU may transmit signaling to control the DU configuration, a random access channel (RACH) format, and/or the like of a DU. In this way, the CU and/or the DU may support mobility (e.g., a mobile CU, a mobile DU, a mobile UE, a combination thereof, and/or the like), increased Doppler shifts, increased frequency offsets, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as a BS 110*a*, a BS 110*b*, a BS 110*c*, and a BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, the BS 110*a* may be a macro BS and a CU for a macro cell 102*a*, the BS 110*b* may be a pico BS for a pico cell 102*b*, the BS 110*c* may be a femto BS for a femto cell 102*c*, the BS 110*d* may be a DU for the macro cell. A BS may support one or multiple (e.g., three) cells. The terms "eNB", "base station", "NR BS", "gNB", "TRP", "AP", "node B", "5G NB", and "cell" may be used interchangeably herein.

Although BS 110a (e.g., a CU) and BS 110d are depicted a separate base stations, a single base station may include both a CU and one or more DUs. For example, BS 110 and BS 110d may be a single base station that includes a CU and a DU that interact as described herein. Further, the single base station (e.g., BS 110a) that includes a CU and a DU may communicate using the CU on an uplink to a core network and the DU on a downlink to one or more other BSs 110 (e.g., to mobile terminals (MTs) of other BSs 110) or UEs 120.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, a combination thereof, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station BS 110d, which may be a DU, may communicate with macro BS 110a and a UE 120e in order to facilitate communication between BS 110a and UE 120e. A relay station may also be referred to as a relay BS, a relay base station, a relay, a combination thereof, and/or the like.

Wireless network 100 may be a heterogeneous network that includes BSs of different types, e.g., macro BSs, pico BSs, femto BSs, relay BSs, a combination thereof, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, a combination thereof, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, a combination thereof, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). A UE 120 may be included inside a housing that houses components of the UE 120, such as processor components, memory components, a combination thereof, and/or the like.

In general, any number of wireless networks may be deployed in a given geographic area. Each wireless network may support a particular RAT and may operate on one or more frequencies. A RAT may also be referred to as a radio technology, an air interface, a combination thereof, and/or the like. A frequency may also be referred to as a carrier, a frequency channel, a combination thereof, and/or the like. Each frequency may support a single RAT in a given geographic area in order to avoid interference between wireless networks of different RATs. In some cases, NR or 5G RAT networks may be deployed.

As shown in FIG. 1, a central unit (CU) such as BS 110a may include a communication manager 140. As described in more detail elsewhere herein, the communication manager 140 may receive, from a distributed unit (DU), a first DU configuration; and transmit, to the DU, a second DU configuration to change a DU configuration from the first DU configuration to the second DU configuration, the first DU configuration being different from the second DU configuration. Additionally, or alternatively, the communication manager 140 may perform one or more other operations described herein.

Similarly, a DU, such as BS 110d, may include a communication manager 150. As described in more detail elsewhere herein, the communication manager 150 may transmit, to a central unit (CU), a first DU configuration; receive, from the CU, a second DU configuration for the DU that is different from the first DU configuration; and override the first DU configuration to communicate in accordance with the second DU configuration. Additionally, or alternatively, the communication manager 150 may perform one or more other operations described herein.

As indicated above, FIG. 1 is provided merely as an example. Other examples may differ from what is described with regard to FIG. 1.

Figure 2:
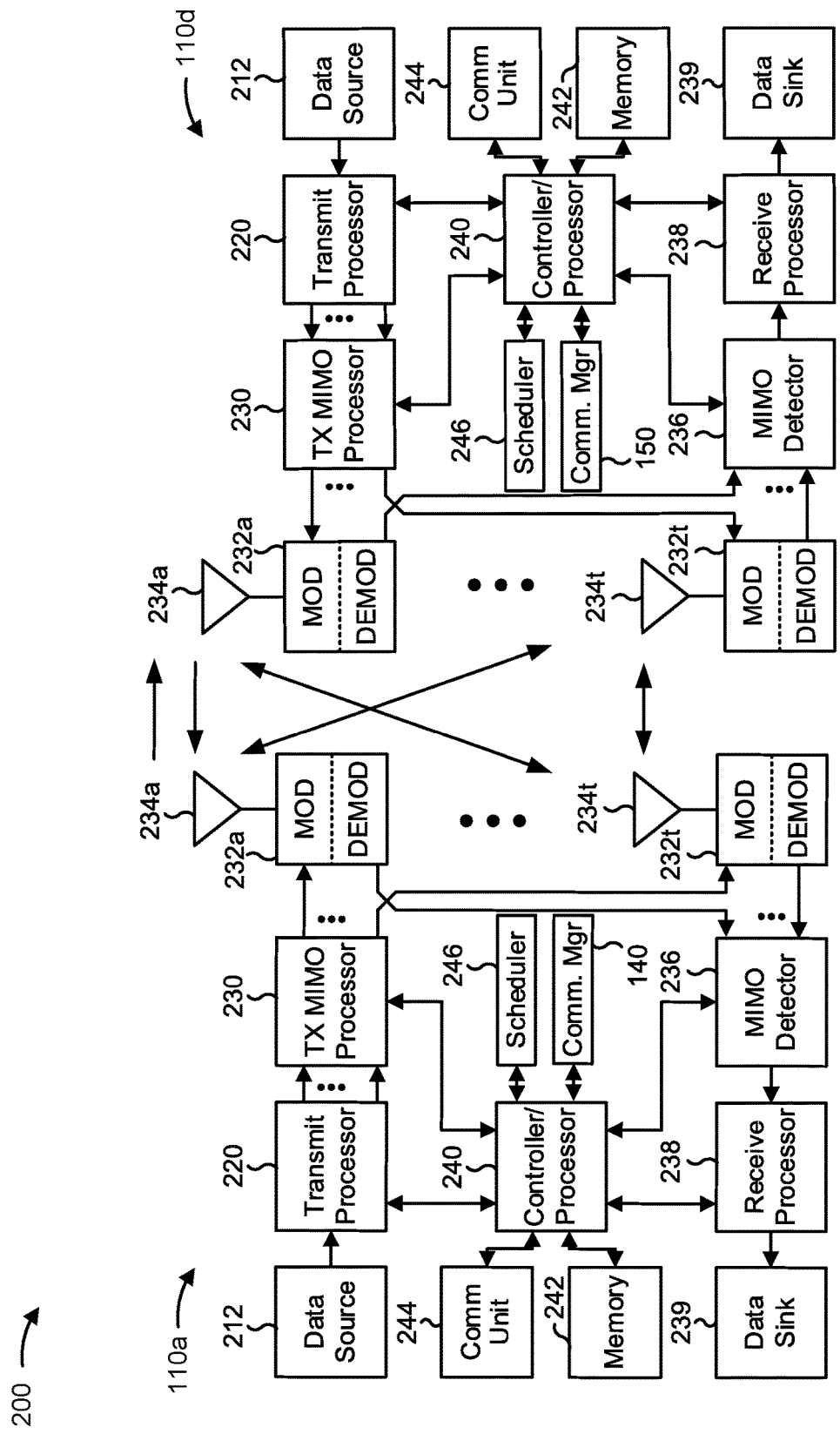
FIG. 2 is a block diagram conceptually illustrating an example of a base station in communication with a UE in a wireless communication network, in accordance with various aspects of the present disclosure.

FIG. 2 shows a block diagram of a design 200 of BS 110a and BS 110d, which may be referred to as BSs 110. BSs 110 may be equipped with T antennas 234a through 234t.

At BSs 110, a transmit processor 220 may receive data from a data source 212 for one or more UEs, one or more other BSs 110, and/or the like, select one or more modulation and coding schemes (MCS) based at least in part on channel quality indicators (CQIs) received, process (e.g., encode and modulate) the data based at least in part on the MCS(s), and provide data symbols. Transmit processor 220 may also process system information (e.g., for semi-static resource partitioning information (SRPI) and/or the like) and control information (e.g., CQI requests, grants, upper layer signaling, a combination thereof, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

Further, at BSs 110, uplink signals may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BSs 110 may include communication unit 244 and communicate to a network controller via communication unit 244.

Controller/processor 240 of BSs 110 and/or any other component(s) of FIG. 2 may perform one or more techniques associated with resource management for multi-hop networks, as described in more detail elsewhere herein. For example, controller/processor 240 of BS 110*a*, BS 110*d*, and/or the like, and/or any other component(s) of FIG. 2 may perform or direct operations of, for example, process 600 of FIG. 6, process 700 of FIG. 7, and/or other processes as described herein. Memory 242 may store data and program codes for BSs 110, respectively. A scheduler 246 may schedule data transmission on the downlink and/or uplink.

In some aspects, BS 110*a* may include means for receiving, from a distributed unit (DU), a first DU configuration, means for transmitting, to the DU, a second DU configuration to change a DU configuration from the first DU configuration to the second DU configuration, the first DU configuration being different from the second DU configuration, and/or the like. Additionally, or alternatively, the BS 110*a* may include means for performing one or more other operations described herein. In some aspects, such means may include the communication manager 140. In some aspects, such means may include one or more components of the BS 110*a* described in connection with FIG. 2.

In some aspects, BS 110*d* may include means for transmitting, to a central unit (CU), a first DU configuration, means for receiving, from the CU, a second DU configuration for the DU that is different from the first DU configuration, means for overriding the first DU configuration to communicate in accordance with the second DU configuration, and/or the like. Additionally, or alternatively, the BS 110*d* may include means for performing one or more other operations described herein. In some aspects, such means may include the communication manager 150. In some aspects, such means may include one or more components of the BS 110*d* described in connection with FIG. 2.

As indicated above, FIG. 2 is provided merely as an example. Other examples may differ from what is described with regard to FIG. 2.

Figure 3A:
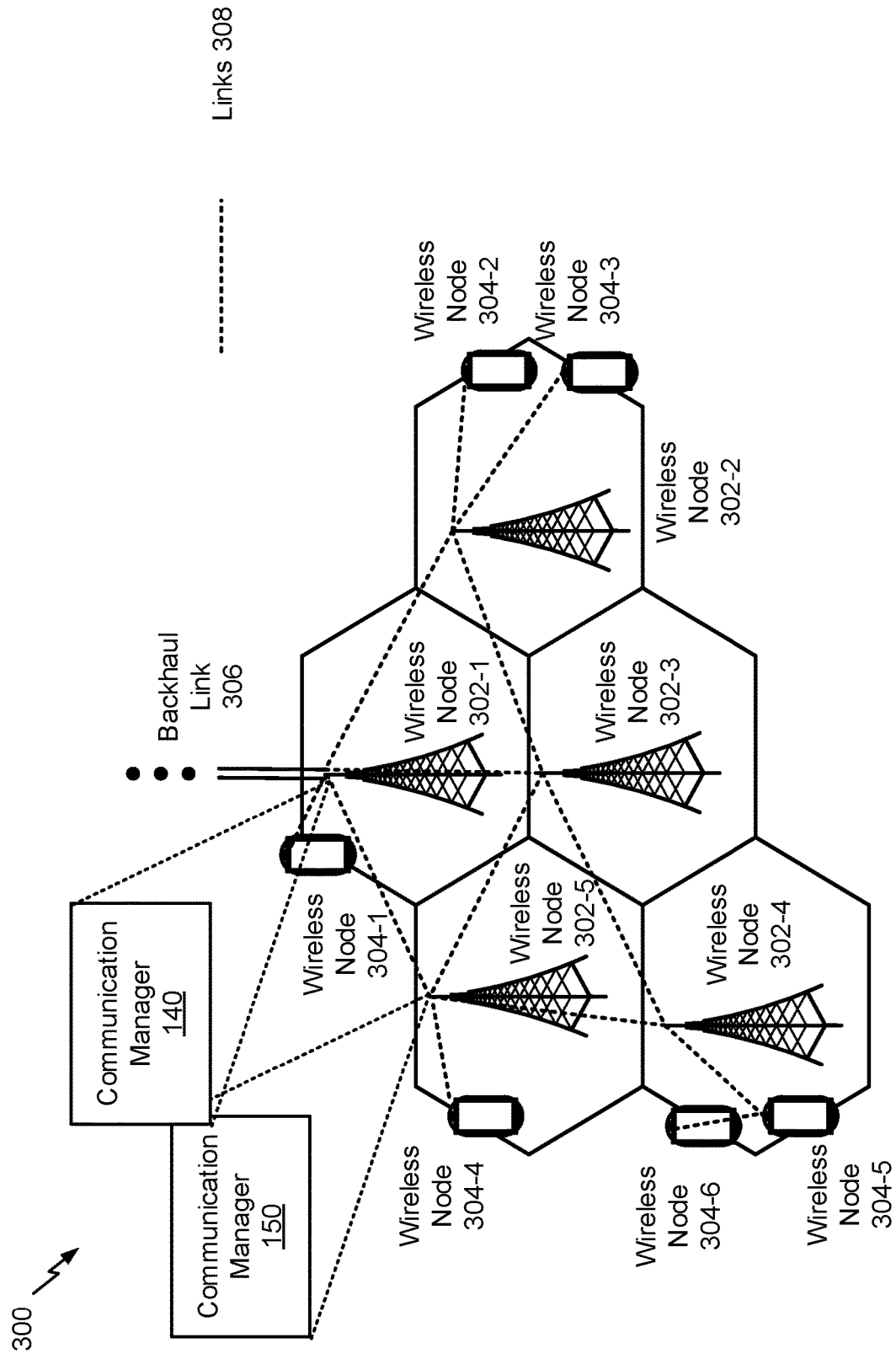
FIGS. 3A and 3B are diagrams illustrating an example of a network topology for a network, in accordance with various aspects of the present disclosure.
Figure 3B:
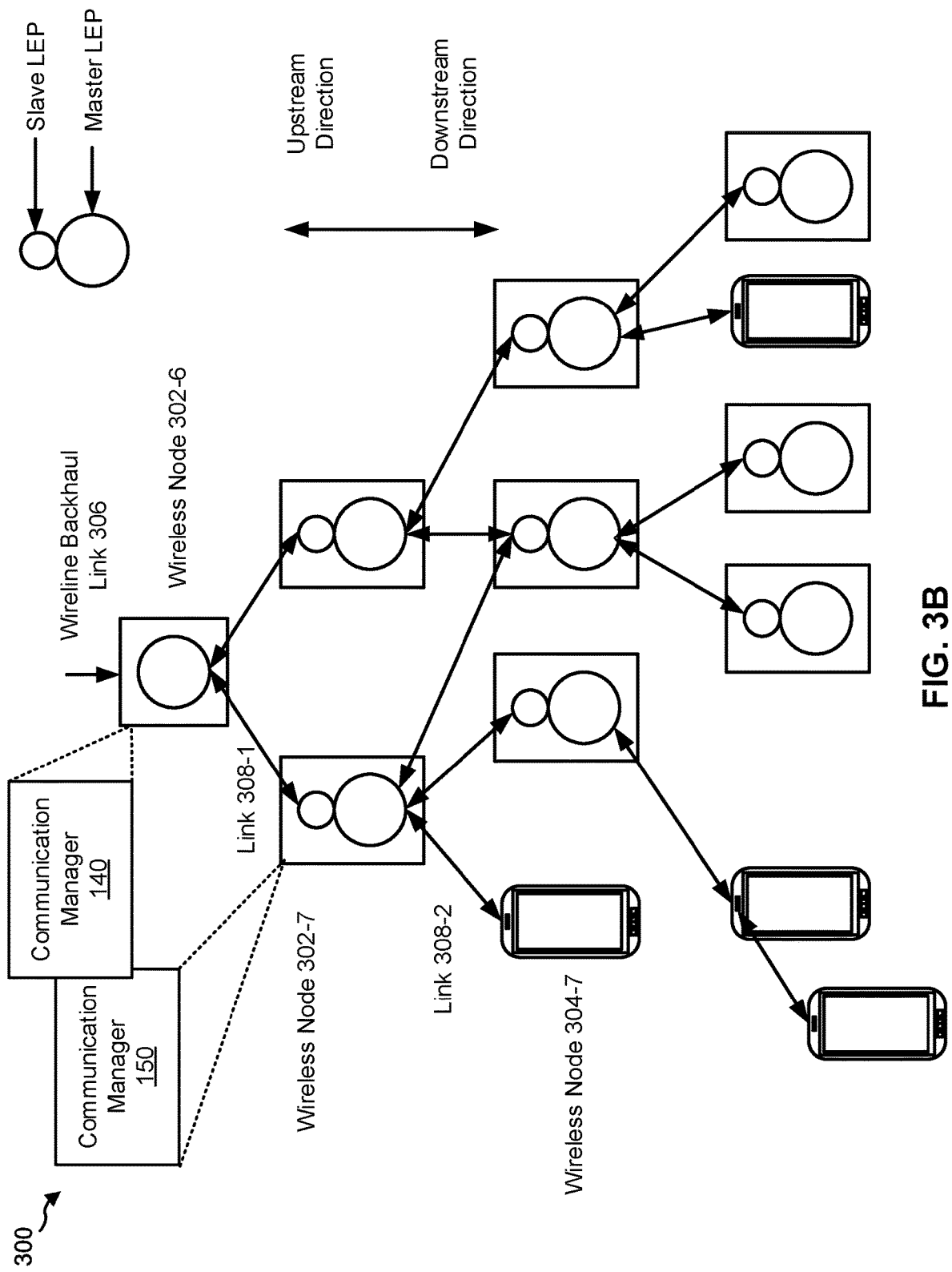

FIGS. 3A and 3B are diagrams illustrating an example 300 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., BS 110*a*, BS 110*d*, and/or the like) may communicate backhaul traffic via first mmWave resources with a second wireless node and may communicate access traffic via second mmWave resources with a third wireless node. Although some aspects, described herein, are described in terms of an IAB deployment, some aspects described herein may be used in connection with other types of multi-hop networks.

As shown in FIG. 3A, example 300 may include multiple wireless nodes 302 (e.g., BSs) and multiple wireless nodes 304 (e.g., UEs). At least one wireless node (e.g., wireless node 302-1, which may be a CU, such as BS 110*a*) may communicate with a core network via a backhaul link 306, such as a fiber connection, a wireless backhaul connection, a combination thereof, and/or the like. Wireless nodes 302 and 304 may communicate with each other using a set of links 308, such as a set of mmWave links; a 3G, 4G, 5G, etc. air interface; and/or the like.

As further shown in FIG. 3A, one or more wireless nodes 302 or 304 may communicate indirectly via one or more other wireless nodes 302 or 304. For example, data may be transferred from a core network to wireless node 304-4 via backhaul link 306, a link 308 between wireless node 302-1 (e.g., BS 110*a*) and wireless node 302-5 (e.g., which may be a DU, such as BS 110*d*), and a link 308 between wireless node 302-5 and wireless node 304-4 (e.g., which may be a UE, such as UE 120*e*).

As shown in FIG. 3B, wireless nodes 302 and wireless nodes 304 can be arranged in a hierarchical topology to enable management of network resources. Each link 308 may be associated with a master link end point (master LEP) and a slave link end point (slave LEP), which may define a hierarchy between wireless nodes 302 or 304. For example, a wireless node 302-6 (e.g., which may be a CU, such as BS 110*a*) may communicate with a wireless node 302-7 (e.g., which may be a DU, such as BS 110*d*, that is a child node or inferior node of wireless node 302-6) via link 308-1, which may be a parent link for wireless node 302-7. Similarly, wireless node 302-7 may communicate with wireless node 304-7 (e.g., which may be a UE, such as UE 120*e*, which may be a child node or inferior node of wireless node 302-7) via link 308-2, which may be a child link for wireless node 302-7. In this case, wireless node 302-6 may schedule for wireless node 302-7, which may schedule for wireless node 304-7 based at least in part on the hierarchy defined herein.

As indicated above, FIGS. 3A and 3B are provided as examples. Other examples are possible and may differ from what was described with respect to FIGS. 3A and 3B.

Figure 4:
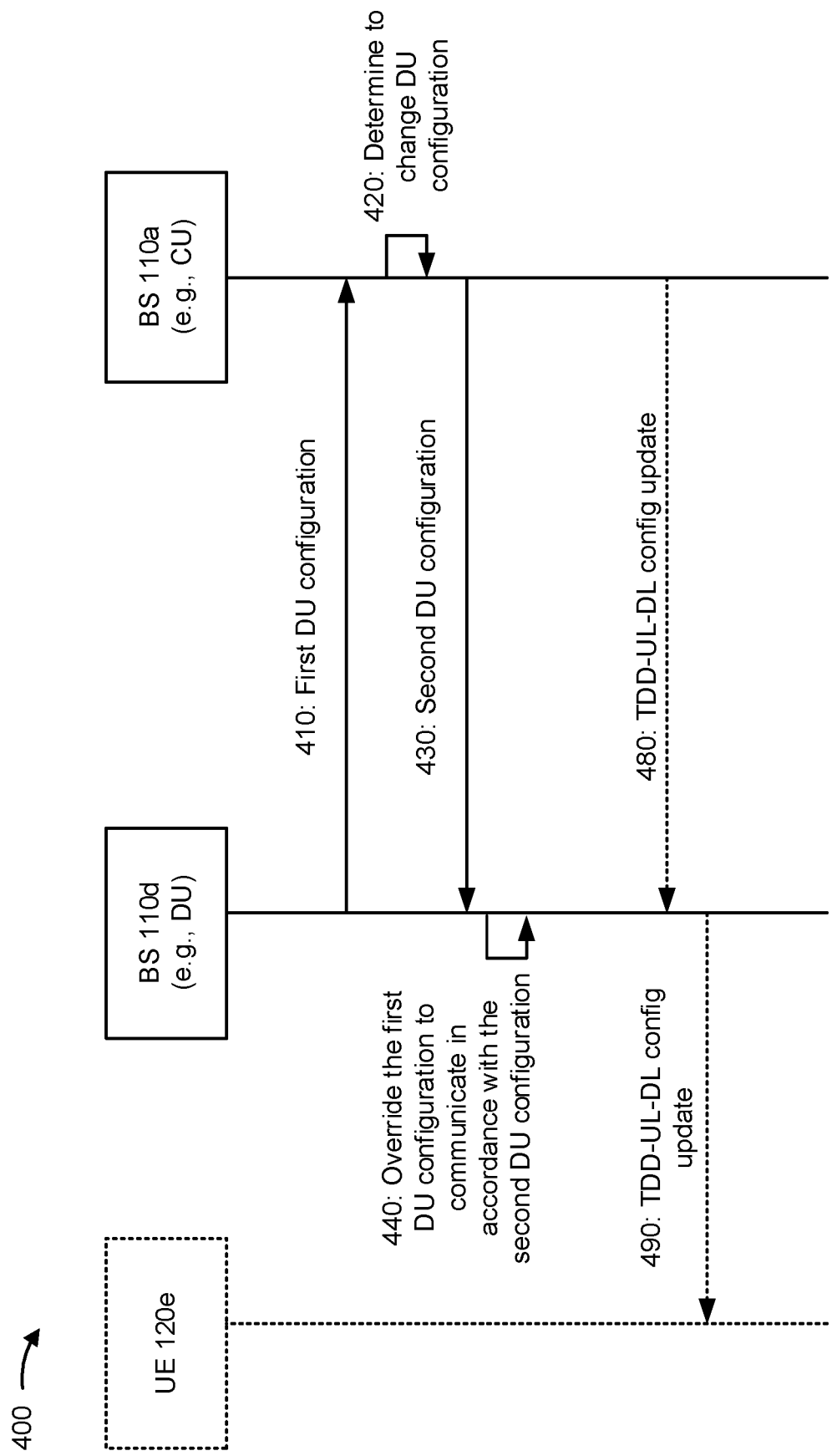
FIGS. 4 and 5 are diagrams illustrating examples of central unit (CU)-distributed unit (DU) interaction based resource management, in accordance with various aspects of the present disclosure.

FIG. 4 is a diagram illustrating an example 400 of resource management for multi-hop networks, in accordance with various aspects of the present disclosure. As shown in FIG. 4, example 400 may include a BS 110*d* (e.g., a DU), a BS 110*a* (e.g., a CU), and a UE 120*e*. As described above, although the CU and the DU are depicted as belonging to separate base stations, the CU and the DU may be implemented as a single base station that includes a CU and one or more DUs (e.g., a single BS 110 may include both BS 110*a* and BS 110*d*).

As further shown in FIG. 4, and by reference number 410, BS 110d may transmit a first DU configuration to BS 110a. For example, BS 110d may transmit a first message that identifies the first DU configuration to BS 110a. In some aspects, the first message may be an F1 setup request message. For example, BS 110d may transmit the F1 setup request message, which may trigger BS 110a to transmit an F1 setup response message as a response to the F1 setup request message. In this case, BS 110a may use the F1 setup response message to override the first DU configuration, as described in more detail herein. Additionally, or alternatively, the first message may be a DU configuration message. For example, BS 110d may transmit a DU configuration update message to BS 110a to identify a change to a DU configuration of BS 110a (e.g., the first DU configuration). In some aspects, the DU configuration update message may include an information element identifying a list of cells to be activated. In this case, BS 110a may transmit a DU configuration update acknowledgement message as a response to the DU configuration update message and to override the DU configuration of BS 110d (e.g., with a second DU configuration), as described in more detail herein.

In some aspects, BS 110d may indicate a content of an information block when indicating the first DU configuration. For example, BS 110d may transmit the first message to indicate the content of a master information block (MIB), a system information block type 1 (SIB1), a combination thereof, and/or the like. In this case, BS 110a may override the MIB, the SIB1, a combination thereof, and/or the like by transmitting a response message identifying a second DU configuration, as described in more detail herein.

In some aspects, the first DU configuration may include DU system information. For example, BS 110d may transmit the first message to identify a set of resources in which to transmit synchronization signal blocks (SSBs), a remaining minimum system information (RMSI) physical downlink control channel (PDCCH) resource, a random access channel (RACH) resource, a RACH configuration, a slot assignment configuration, a transmit power (e.g., of BS 110d and/or BS 110a), a random access channel (RACH) format, a power configuration, a combination thereof, and/or the like. In some aspects, BS 110d may transmit one or more messages identifying an SSB configuration that may include information identifying SSB resources for transmitting an SSB (e.g., SSB frequency information, SSB transmission bandwidth information, SSB transmission periodicity information, SSB transmission timing offset information, an SSB selection, a combination thereof, and/or the like). In this case, the slot assignment configuration may be a time-division-duplex-uplink-downlink configuration (a TDD-UL-DL configcommon parameter) that identifies whether a slot is assigned as an uplink slot, a downlink slot, a flexible slot (e.g., for uplink and/or downlink), a combination thereof, and/or the like.

As further shown in FIG. 4, and by reference number 420, BS 110a may determine to change the DU configuration of BS 110d. For example, BS 110a may determine that the DU configuration of BS 110d is to be changed to alter a set of resources in which to transmit SSBs, an RMSI PDCCH resource, a RACH resource, a RACH configuration, a TD-UL-DL configcommon parameter, a synchronization signal physical broadcast channel block power configuration (ss-PBCH-BlockPower) parameter, a combination thereof, and/or the like. In some aspects, BS 110a may determine to change the DU configuration based at least in part on a state of a network. For example, based at least in part on network traffic to be transmitted to a set of BSs 110 (e.g., BS 110d and one or more other BSs 110), a network condition, and/or the like, BS 110a may determine to change the DU configuration to optimize allocation of network resources. In some aspects, BS 110a may determine to change a set of parameters of an indicated cell identified in a list of cells to be activated for an F1 setup response message, a DU configuration update acknowledgement message, a CU configuration update message, and/or the like.

As further shown in FIG. 4, and by reference number 430, BS 110a may transmit a second DU configuration to BS 110d. For example, BS 110a may transmit a second message to BS 110d that identifies the second DU configuration. In some aspects, the second message may explicitly identify the second DU configuration. For example, BS 110a may include an information element, a flag, a field, and/or the like that explicitly signals a parameter of the second DU configuration, a change to a parameter of the first DU configuration, and/or the like. Additionally, or alternatively, BS 110d may implicitly signal the first DU configuration. For example, BS 110 may transmit a resource allocation that conflicts with the first DU configuration, thereby implicitly signaling a second DU configuration that does not conflict with the resource allocation.

In some aspects, BS 110a may transmit an F1 setup response message to convey the second DU configuration. For example, BS 110a may transmit an F1 setup response message that includes one or more information elements (IEs) to convey the second DU configuration. Additionally, or alternatively, BS 110a may transmit a DU configuration update acknowledgement message to convey the second DU configuration. For example, BS 110a may transmit the DU configuration update acknowledgement message with one or more information elements, flags, fields, and/or the like to convey the second DU configuration.

As further shown in FIG. 4, and by reference number 440, BS 110d may override the first DU configuration to communicate in accordance with the second DU configuration. For example, BS 110d may alter a DU configuration of BS 110d and may communicate in accordance with the second DU configuration. In this case, BS 110d may transmit and/or receive based at least in part on a TDD-UL-DL configcommon parameter of the second DU configuration, an allocation of resources for transmitting SSBs of the second DU configuration, a combination thereof, and/or the like.

As further shown in FIG. 4, and by reference number 480, in some aspects, at a later time BS 110a may transmit a message to BS 110d to update a TDD-UL-DL configuration parameter. For example, to comply with a time-division-duplexing (TTD) requirement of a network, BS 110a may determine to alter a slot assignment of slots used by BS 110d. In this case, BS 110a may provide BS 110d with an updated TDD-UL-DL configcommon parameter. Additionally, or alternatively, BS 110a may provide BS 110d with a TDD-UL-DL configDedicated parameter. In this case, a slot configuration of TDD-UL-DL configDedicated may not comply with a TDD-UL-DL configcommon parameter of BS 110d.

As a result, and as further shown in FIG. 4, and by reference number 490, BS 110d may send a message to UE 120e to update a slot configuration. For example, BS 110d may alter an uplink slot (e.g., to a downlink slot or a flexible slot), a downlink slot (e.g., to an uplink slot or a flexible slot), a flexible slot (e.g., to an uplink slot or a downlink slot), a combination thereof, and/or the like. In this case, BS 110d may update the TDD-UL-DL configcommon parameter to alter the slot assignment in accordance with the message received from BS 110*a* and may send the updated TDD-UL-DL configcommon parameter to UE 120*e*. Additionally, or alternatively, BS 110*d* my forward the TDD-UL-DL configDedicated parameter to UE 120*e*. In this case, UE 120*e* may update the slot configuration based at least in part on the received TDD-UL-DL configDedicated parameter that may not comply with a TDD-UL-DL configcommon that UE 120*e* has previously received from BS 110*d*.

As indicated above, FIG. 4 is provided as an example. Other examples may differ from what is described with respect to FIG. 4.

Figure 5:
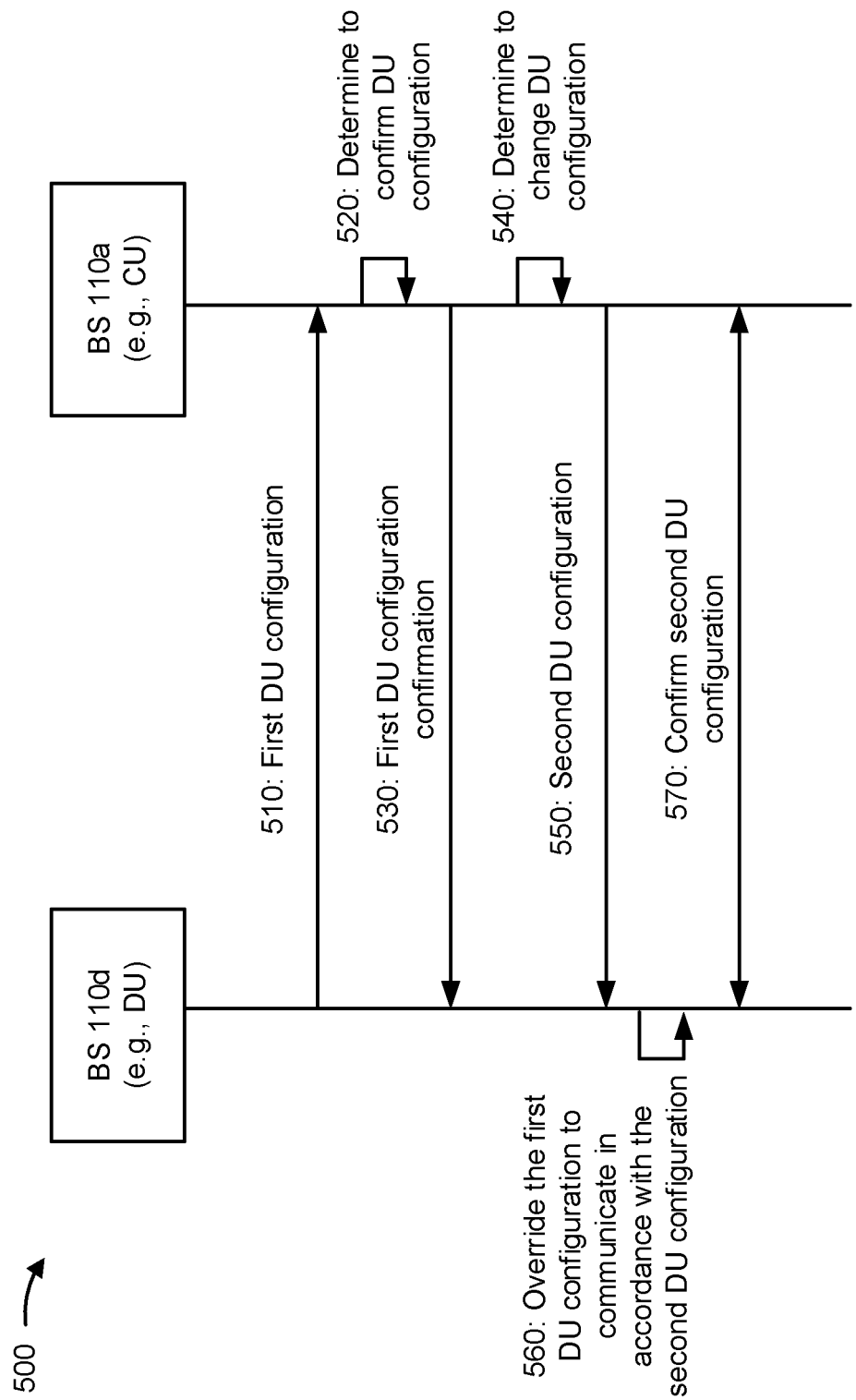

FIG. 5 is a diagram illustrating an example 500 of resource management for multi-hop networks, in accordance with various aspects of the present disclosure. As shown in FIG. 5, example 500 may include a BS 110*a* (e.g., a CU) and a BS 110*d* (e.g., a DU).

As further shown in FIG. 5, and by reference number 510, BS 110*d* may transmit a first DU configuration to BS 110*a*. For example, BS 110*d* may transmit an F1 setup request message identifying a MIB, a SIB1, a combination thereof, and/or the like and a set of parameters associated therewith, as described in more detail above. As shown by reference numbers 520 and 530, BS 110*a* may determine to confirm the DU configuration and may transmit the first DU configuration to BS 110*d* to confirm the DU configuration. For example, BS 110*a* may determine, based at least in part on network traffic associated with BS 110*d* and/or other BSs 110 (e.g., other DUs), that the first DU configuration is to be used for BS 110*d*. In this case, BS 110*a* may transmit an F1 setup response message to confirm the first DU configuration and BS 110*d* may communicate in accordance with the first DU configuration.

As further shown in FIG. 5, and by reference number 540, at a subsequent time, BS 110*a* may determine to change the DU configuration of BS 110*d*. For example, BS 110*a* may determine a resource allocation for BS 110*d* that conflicts with the first DU configuration. In this case, as shown by reference number 550, BS 110*a* may transmit the second DU configuration to BS 110*d*. For example, BS 110*a* may transmit a resource allocation message that identifies a resource allocation that conflicts with the first DU configuration, thereby implicitly conveying a second DU configuration. In some, aspects, the resource allocation may be a semi-static resource allocation.

As further shown in FIG. 5, and by reference number 560, BS 110*d* may override the first DU configuration based at least in part on receiving the second DU configuration from BS 110*a*. For example, BS 110*d* may determine that the resource allocation conflicts with the first DU configuration, may determine a second DU configuration that does not conflict with the resource allocation, and may override the first DU configuration to communicate in accordance with the second DU configuration. In some aspects, BS 110*d* may receive an indication, from BS 110*a*, of a maximum transmit power, a maximum receive power, a set of RACH configurations, and/or the like. In this case, BS 110*d* may update a corresponding parameter of BS 110*d* based at least in part on the received indication (e.g., BS 110*d* may update a maximum transmit power, a maximum receive power, a RACH configuration, and/or the like). As shown by reference number 570, based at least in part on BS 110*d* deriving the second DU configuration, BS 110*d* and BS 110*a* may communicate to confirm the second DU configuration. For example, BS 110*d* may transmit a DU configuration update request message to convey the second DU configuration and BS 110*a* may transmit a DU configuration update acknowledgement message as a response to confirm the second DU configuration.

As indicated above, FIG. 5 is provided as an example. Other examples may differ from what is described with respect to FIG. 5.

Figure 6:
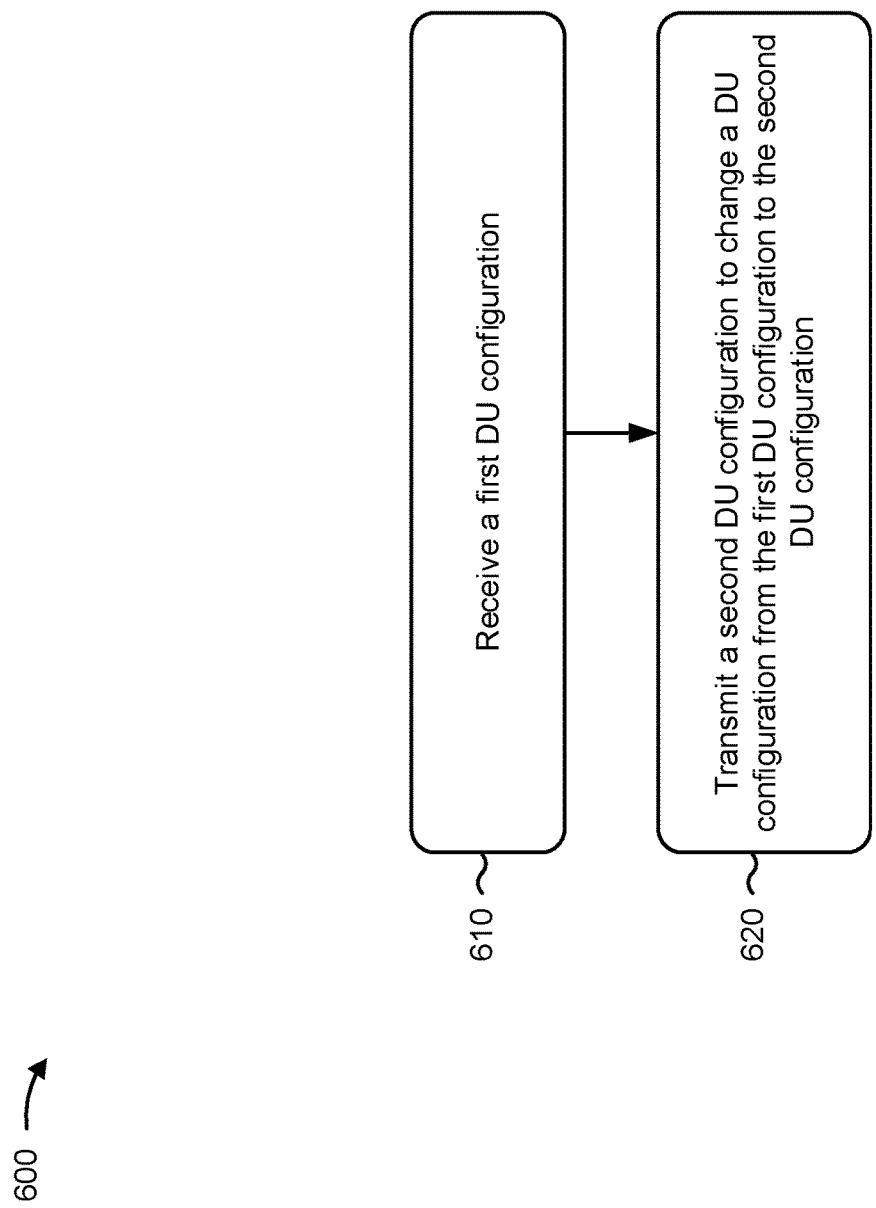
FIG. 6 is a diagram illustrating an example process performed, for example, by a CU, in accordance with various aspects of the present disclosure.

FIG. 6 is a diagram illustrating an example process 600 performed, for example, by a CU, in accordance with various aspects of the present disclosure. Example process 600 is an example where a CU (e.g., BS 110*a* and/or the like) performs operations associated with resource management for multi-hop networks.

As shown in FIG. 6, in some aspects, process 600 may include receiving a first DU configuration (block 610). For example, the CU (e.g., using transmit processor 220, receive processor 238, controller/processor 240, memory 242, a combination thereof, and/or the like) may receive, from a distributed unit (DU), a first DU configuration, as described above.

As further shown in FIG. 6, in some aspects, process 600 may include transmitting a second DU configuration to change a DU configuration from the first DU configuration to the second DU configuration (block 620). For example, the CU (e.g., using transmit processor 220, receive processor 238, controller/processor 240, memory 242, a combination thereof, and/or the like) may transmit, to the DU, a second DU configuration to change a DU configuration from the first DU configuration to the second DU configuration. In some aspects, the first DU configuration being different from the second DU configuration, as described above.

Process 600 may include additional aspects, such as any single implementation or any combination of aspects described below and/or in connection with one or more other processes described elsewhere herein.

In a first aspect, the first DU configuration is associated with a system information block type 1 (SIB1) or a master information block (MIB).

In a second aspect, alone or in combination with the first aspect, receiving the first DU configuration includes receiving a message from the DU, the message including information identifying the first DU configuration.

In a third aspect, alone or in combination with one or more of the first and second aspects, transmitting the second DU configuration includes transmitting a message to the DU, the message including information identifying the second DU configuration.

In a fourth aspect, alone or in combination with one or more of the first through third aspects, the first DU configuration is conveyed via an F1 setup request message and the second DU configuration is conveyed via an F1 setup response message explicitly identifying the second DU configuration.

In a fifth aspect, alone or in combination with one or more of the first through fourth aspects, the second DU configuration is associated with overriding DU system information of the first DU configuration.

In a sixth aspect, alone or in combination with one or more of the first through fifth aspects, the second DU configuration identifies a change to at least one of a synchronization signal block (SSB) configuration, a remaining minimum system information (RMSI) physical downlink control channel (PDCCH) resource configuration, a random access channel (RACH) resource configuration, a slot utilization configuration, a transmit power, a RACH format configuration, a power configuration, a parameter of a cell that is to be activated or a combination thereof.

In a seventh aspect, alone or in combination with one or more of the first through sixth aspects, the first DU configuration is conveyed via a DU configuration update message and the second DU configuration is conveyed via a DU configuration update acknowledgement message.

In an eighth aspect, alone or in combination with one or more of the first through seventh aspects, the first DU configuration is conveyed via an F1 setup request message and the second DU configuration is conveyed via a resource allocation message identifying a resource allocation that implicitly identifies the second DU configuration.

In a ninth aspect, alone or in combination with one or more of the first through eighth aspects, process 600 may include transmitting, after completing an F1 setup procedure associated with the F1 setup response message, an indication of a parameter for updating a DU or a child node of the DU, wherein the parameter is at least one of: a maximum transmit power, a maximum receive power, a random access channel (RACH) format configuration, or a combination thereof.

In a tenth aspect, alone or in combination with one or more of the first through ninth aspects, process 600 may include transmitting, after receiving the first DU configuration and before transmitting the second DU configuration, an F1 setup response message.

In an eleventh aspect, alone or in combination with one or more of the first through tenth aspects, the F1 setup response message is associated with confirming the first DU configuration.

In a twelfth aspect, alone or in combination with one or more of the first through eleventh aspects, the F1 setup response message is associated with identifying a third DU configuration that is different from the first DU configuration and the second DU configuration, the third DU configuration overriding the first DU configuration and the second DU configuration overriding the third DU configuration.

In a thirteenth aspect, alone or in combination with one or more of the first through twelfth aspects, process 600 may include transmitting a message to a user equipment (UE), the message including the second DU configuration for the DU.

In a fourteenth aspect, alone or in combination with one or more of the first through thirteenth aspects, transmitting, to the UE, the second DU configuration includes transmitting the second DU configuration to the DU to cause the DU to convey the second DU configuration to the UE.

In a fifteenth aspect, alone or in combination with one or more of the first through fourteenth aspects, process 600 may include transmitting a slot configuration indicator to the UE to alter an assignment of at least one of a slot assigned as an uplink slot, a slot assigned as a downlink slot, a slot assigned as a flexible slot, or a combination thereof.

In a sixteenth aspect, alone or in combination with one or more of the first through fifteenth aspects, process 600 may include reconfiguring a set of parameters of a cell identified in a list of cells to be activated based at least in part on a CU configuration update message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a DU, in accordance with various aspects of the present disclosure. Example process 700 is an example where a DU (e.g., BS 110d and/or the like) performs operations associated with resource management for multi-hop networks.

As shown in FIG. 7, in some aspects, process 700 may include transmitting a first DU configuration (block 710). For example, the DU (e.g., using transmit processor 220, receive processor 238, controller/processor 240, memory 242, a combination thereof, and/or the like) may transmit, to a central unit (CU), a first DU configuration, as described above.

As further shown in FIG. 7, in some aspects, process 700 may include receiving a second DU configuration for the DU that is different from the first DU configuration (block 720). For example, the DU (e.g., using transmit processor 220, receive processor 238, controller/processor 240, memory 242, a combination thereof, and/or the like) may receive, from the CU, a second DU configuration for the DU that is different from the first DU configuration, as described above.

As further shown in FIG. 7, in some aspects, process 700 may include overriding the first DU configuration to communicate in accordance with the second DU configuration (block 730). For example, the DU (e.g., using transmit processor 220, receive processor 238, controller/processor 240, memory 242, a combination thereof, and/or the like) may override the first DU configuration to communicate in accordance with the second DU configuration, as described above.

Process 700 may include additional aspects, such as any single implementation or any combination of aspects described below and/or in connection with one or more other processes described elsewhere herein.

In a first aspect, transmitting the first DU configuration includes transmitting a message to the CU, the message including information identifying the first DU configuration.

In a second aspect, alone or in combination with the first aspect, receiving the second DU configuration includes receiving a message from the CU, the message including information identifying the second DU configuration.

In a third aspect, alone or in combination with one or more of the first and second aspects, the first DU configuration is associated with a system information block type 1 (SIB1) or a master information block (MIB).

In a fourth aspect, alone or in combination with one or more of the first through third aspects, the first DU configuration is conveyed via an F1 setup request message and the second DU configuration is conveyed via an F1 setup response message.

In a fifth aspect, alone or in combination with one or more of the first through fourth aspects, overriding the first DU configuration includes overriding DU system information of the first DU configuration.

In a sixth aspect, alone or in combination with one or more of the first through fifth aspects, the second DU configuration identifies a change to at least one of, a synchronization signal block (SSB) configuration, a remaining minimum system information (RMSI) physical downlink control channel (PDCCH) resource configuration, a random access channel (RACH) resource configuration, a slot utilization configuration, a transmit power, a RACH format configuration, a power configuration, a parameter of a cell that is to be activated, or a combination thereof.

In a seventh aspect, alone or in combination with one or more of the first through sixth aspects, the first DU configuration is conveyed via a DU configuration update message and the second DU configuration is conveyed via a DU configuration update acknowledgement message.

In an eighth aspect, alone or in combination with one or more of the first through seventh aspects, the first DU configuration is conveyed via an F1 setup request message and the second DU configuration is conveyed via is a resource allocation message.

In a ninth aspect, alone or in combination with one or more of the first through eighth aspects, process 700 may include receiving, after transmitting the first DU configuration and before receiving the second DU configuration, an F1 setup response message.

In a tenth aspect, alone or in combination with one or more of the first through ninth aspects, the F1 setup response message is associated with confirming the first DU configuration.

In an eleventh aspect, alone or in combination with one or more of the first through tenth aspects, process 700 may include overriding the first DU configuration with a third DU configuration received in the F1 setup response message.

In a twelfth aspect, alone or in combination with one or more of the first through eleventh aspects, overriding the first DU configuration to communicate in accordance with the second DU configuration includes overriding the third DU configuration with the second DU configuration.

In a thirteenth aspect, alone or in combination with one or more of the first through twelfth aspects, process 700 includes determining, based at least in part on a resource allocation received from the DU, that the resource allocation conflicts with the first DU configuration; determining the second DU configuration based at least in part on the resource allocation and based at least in part on determining that the resource allocation conflicts with the first DU configuration; and overriding the first DU configuration to communicate using the resource allocation.

In a fourteenth aspect, alone or in combination with one or more of the first through thirteenth aspects, process 700 includes initiating a DU configuration update procedure to indicate the second DU configuration based at least in part on determining the second DU configuration.

In a fifteenth aspect, alone or in combination with one or more of the first through fourteenth aspects, process 700 includes determining that the resource allocation conflicts with the first DU configuration based at least in part on at least one of a synchronization signal block (SSB) allocation, a random access channel (RACH) allocation, a remaining minimum system information (RMSI) physical downlink control channel allocation, a slot configuration compliance parameter, a resource availability parameter, or a combination thereof.

In a sixteenth aspect, alone or in combination with one or more of the first through fifteenth aspects, process 700 includes receiving, after completing an F1 setup procedure associated with the F1 setup request message, an indication of a parameter, wherein the parameter is at least one of a maximum transmit power, a maximum receive power, a random access channel (RACH) format configuration, or a combination thereof.

In a seventeenth aspect, alone or in combination with one or more of the first through sixteenth aspects, process 700 includes updating the first DU configuration based at least in part on the parameter.

In an eighteenth aspect, alone or in combination with one or more of the first through seventeenth aspects, process 700 includes updating a configuration of a child node of the DU based at least in part on the parameter.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a central unit (CU), comprising:
receiving, from a distributed unit (DU), a first DU configuration; and transmitting, to the DU, a second DU configuration, identifying a change to a synchronization signal block (SSB) configuration of the DU, to change a DU configuration from the first DU configuration to the second DU configuration, the first DU configuration being different from the second DU configuration.

2. The method of claim 1, wherein the first DU configuration is associated with a system information block type 1 (SIB1) or a master information block (MIB).

3. The method of claim 1, wherein receiving the first DU configuration comprises:
receiving a message from the DU, the message including information identifying the first DU configuration.

4. The method of claim 1, wherein transmitting the second DU configuration comprises:
transmitting a message to the DU, the message including information identifying the second DU configuration.

5. The method of claim 1, wherein the first DU configuration is conveyed via an F1 setup request message and the second DU configuration is conveyed via an F1 setup response message explicitly identifying the second DU configuration.

6. The method of claim 1, wherein the second DU configuration is associated with overriding DU system information of the first DU configuration.

7. The method of claim 1, wherein the second DU configuration identifies a change to at least one of:
a remaining minimum system information (RMSI) physical downlink control channel (PDCCH) resource configuration,
a random access channel (RACH) resource configuration,
a slot utilization configuration,
a transmit power,
a RACH format configuration,
a power configuration,
a parameter of a cell that is to be activated, or
a combination thereof.

8. The method of claim 1, wherein the first DU configuration is conveyed via a DU configuration update message and the second DU configuration is conveyed via a DU configuration update acknowledgement message.

9. The method of claim 1, wherein the first DU configuration is conveyed via an F1 setup request message and the second DU configuration is conveyed via a resource allocation message identifying a resource allocation that implicitly identifies the second DU configuration.

10. The method of claim 9, further comprising:
transmitting, after receiving the first DU configuration and before transmitting the second DU configuration, an F1 setup response message.

11. The method of claim 1, further comprising:
reconfiguring a set of parameters of a cell identified in a list of cells to be activated based at least in part on a CU configuration update message.

12. A method of wireless communication performed by a distributed unit (DU), comprising:
transmitting, to a central unit (CU), a first DU configuration;
receiving, from the CU, a second DU configuration, identifying a change to a synchronization signal block (SSB) configuration of the DU, that is different from the first DU configuration; and
overriding the first DU configuration to communicate in accordance with the second DU configuration.

13. The method of claim 12, wherein transmitting the first DU configuration comprises:
transmitting a message to the CU, the message including information identifying the first DU configuration.

14. The method of claim 12, wherein receiving the second DU configuration comprises:
receiving a message from the CU, the message including information identifying the second DU configuration.

15. The method of claim 12, wherein the first DU configuration is associated with a system information block type 1 (SIB1) or a master information block (MIB).

16. The method of claim 12, wherein the first DU configuration is conveyed via an F1 setup request message and the second DU configuration is conveyed via an F1 setup response message.

17. The method of claim 16, further comprising:
receiving, after completing an F1 setup procedure associated with the F1 setup request message, an indication of a parameter.

18. The method of claim 17, wherein the parameter is at least one of:
a maximum transmit power,
a maximum receive power,
a random access channel (RACH) format configuration, or
a combination thereof.

19. The method of claim 17, further comprising:
updating the first DU configuration based at least in part on the parameter.

20. The method of claim 17, further comprising:
updating a configuration of a child node of the DU based at least in part on the parameter.

21. The method of claim 12, further comprising:
determining, based at least in part on a resource allocation received from the DU, that the resource allocation conflicts with the first DU configuration;
determining the second DU configuration based at least in part on the resource allocation and based at least in part on determining that the resource allocation conflicts with the first DU configuration; and
wherein overriding the first DU configuration comprises:
overriding the first DU configuration to communicate using the resource allocation.

22. The method of claim 21, further comprising:
initiating a DU configuration update procedure to indicate the second DU configuration based at least in part on determining the second DU configuration.

23. The method of claim 21, further comprising:
determining that the resource allocation conflicts with the first DU configuration based at least in part on at least one of:
a synchronization signal block (SSB) allocation,
a random access channel (RACH) allocation,
a remaining minimum system information (RMSI) physical downlink control channel allocation,
a slot configuration compliance parameter,
a resource availability parameter, or
a combination thereof.

24. A method of wireless communication performed by a central unit (CU), comprising:
receiving, from a distributed unit (DU), a first DU configuration; and
transmitting, to the DU, a second DU configuration to change a DU configuration from the first DU configuration to the second DU configuration, the first DU configuration being different from the second DU configuration, wherein the second DU configuration identifies a change to a synchronization signal block (SSB) configuration of the DU.

25. The method of claim 24, wherein the first DU configuration is associated with a system information block type 1 (SIB1) or a master information block (MIB).

26. The method of claim 24, wherein transmitting the second DU configuration comprises:

transmitting a message to the DU, the message including information identifying the second DU configuration.

27. The method of claim 24, wherein the first DU configuration is conveyed via an F1 setup request message and the second DU configuration is conveyed via an F1 setup response message explicitly identifying the second DU configuration.

28. A distributed unit (DU) for wireless communication, comprising:

a memory; and one or more processors coupled to the memory, the one or more processors configured to:

transmit, to a central unit (CU), a first DU configuration;

receive, from the CU, a second DU configuration, identifying a change to a synchronization signal block (SSB) configuration of the DU, that is different from the first DU configuration; and override the first DU configuration to communicate in accordance with the second DU configuration.

29. The DU of claim 28, wherein the one or more processors, when transmitting the first DU configuration, are to:

transmit a message to the CU, the message including information identifying the first DU configuration.

30. The DU of claim 28, wherein the first DU configuration identifies a second SSB configuration of the DU that is different from the SSB configuration of the second DU configuration.

* * * * *